Jan. 30, 1951   J. W. MILLER   2,540,005
VENTILATING APPARATUS
Filed July 2, 1945
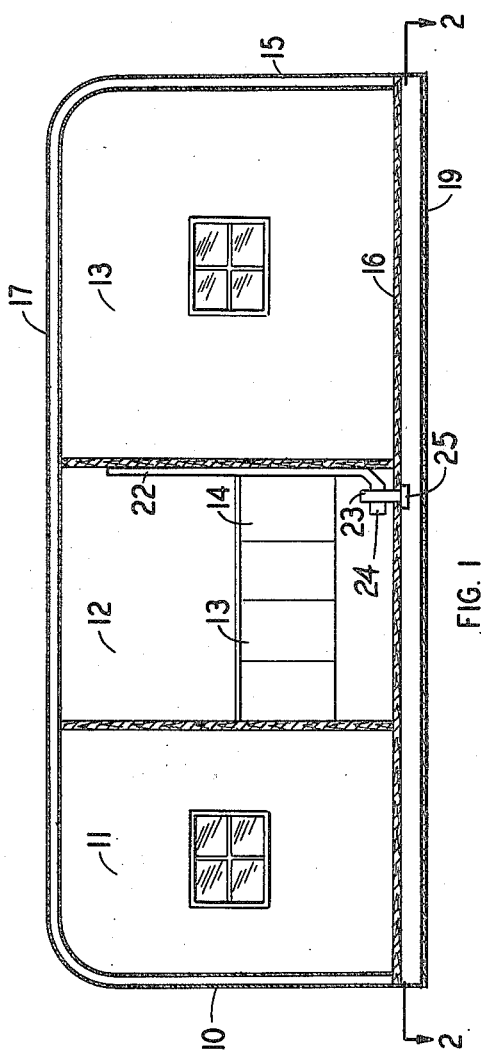
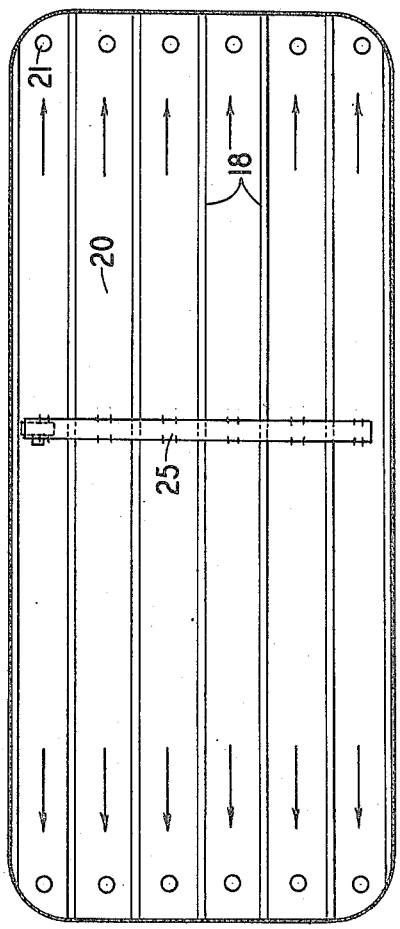
INVENTOR.
JOHN W. MILLER
BY Carroll R. Taber
ATTORNEY Patented Jan. 30, 1951

2,540,005

UNITED STATES PATENT OFFICE 2,540,005

VENTILATING APPARATUS

John W. Miller, Lansing, Mich., assignor to Motor Wheel Corporation, Lansing, Mich., a corporation of Michigan Application July 2, 1945, Serial No. 602,883

6 Claims. (Cl. 98—31)

This invention relates to ventilating systems for dwellings.

In certain types of dwellings, particularly relatively small houses and house trailers, the humidity of the atmosphere in the dwelling is raised by evaporation of moisture in cooking and by respiration of the occupants of the dwelling, to such a point that even in mild weather there is considerable condensation on the walls and windows of the dwelling. Often this moisture collects in the form of frost, and in melting it may cause damage to the walls and window frames of the dwelling.

It has been discovered that to maintain the humidity of the atmosphere within the dwelling at a level which is comfortable and still not highly saturated, a relatively large quantity of air must be removed in a given length of time. The quantity varies considerably, but as an example, in a house trailer for conventional proportions, and in zero weather, approximately 50 cubic feet of air per minute must be removed to maintain the desired moisture conditions within the trailer. Removing such a large amount of air in such a short time results in a very high heat loss from the dwelling, and therefore, makes for uneconomical operation of the heating system for the dwelling.

Accordingly, the principal object of this invention is to provide apparatus for maintaining the humidity of a trailer or small dwelling at a comfortable level without excessive loss of heat from the trailer.

Another object is to provide a ventilating system which will remove undesirable odors from the dwelling without excessive loss of heat.

These objects will more fully appear in the following specification when read in connection with the accompanying drawings, wherein:

Figure 1 is a schematic view of a conventional house trailer embodying the present invention; and Figure 2 is a cross-sectional view taken on substantially the line 2—2 of Figure 1.

The drawings illustrate a house trailer 10 having three rooms 11, 12 and 13 therein. The central room 12 preferably constitutes the kitchen for the trailer, and is provided with a stove 14, which is employed for heating the trailer and for cooking the food for the occupants of the trailer.

The trailer is enclosed by side walls 15, a floor 16, and roof or ceiling 17. Preferably the walls 15 and ceiling 17 are double walls having insulation therebetween.

The floor 16 may be of wood or other suitable material supported on a plurality of laterally spaced longitudinally extending joists 18, the ends of which are attached to the outer skin of the side walls 15. Below the joists and attached thereto is a bottom panel 19 which may be of one or several pieces. The outer periphery of the panel 19 is attached to the outer skin of the walls 15. The floor 16, the joists 18 and the panel 19 together form a plurality of longitudinally extending ducts 20 through which air may be passed in a manner which will be presently described. Outlet openings 21 are formed in the bottom panel 19 adjacent the longitudinal extremities thereof. Preferably there are two openings in each duct 20 adjacent the ends thereof.

Within the dwelling space of the trailer is a generally upright duct 22. Preferably the duct 22 is located in the kitchen and near the stove 14. The upper end of the duct is open and is located adjacent the ceiling 17 of the trailer. For best results the open upper end of the duct 22 should be located in the space above the stove 14. The lower end of the duct 22 is connected to the inlet of a centrifugal fan 23 operated by a motor 24. Preferably the fan 23 is placed near the floor and in a position where it will not interfere with the usual occupancy of the trailer.

The outlet of the fan 23 communicates with a manifold 25 which extends transversely of the trailer and preferably is located beneath the floor 16. The manifold is provided with a plurality of outlet openings communicating with each of the ducts 20 beneath the floor.

As will be obvious from the foregoing description of the invention, the fan 23 withdraws air from the trailer through the open upper end of the duct 22 and discharges it into the manifold 25. From the manifold 25 the air flows both ways in the ducts 20 and discharges through the openings 21 in the panel 19. In this way the relatively warm and humid air within the dwelling can be discharged from the trailer at a rate rapid enough to maintain the desired humidity conditions within the trailer. Also, undesirable odors from cooking can be removed from the trailer.

It is notorious that the floors of house trailers are usually very cold. Thus the present invention is an important asset to the heating system of the trailer because by conducting warm air beneath the floor in heat exchange relation therewith, the floor is relatively easily heated. At the same time the heat which is used to warm the floor comes from the warm humid air that it is desired to discharge from the trailer.

From the foregoing it will be seen that the present invention provides a means for rapidly ventilating and dehumidifying a small dwelling, such as a trailer, in a simple and effective manner, without excessive loss of heat from the dwelling.

While the present invention has been designed especially for house trailers, it will be apparent that it is fully as effective in ordinary dwellings, especially those of small cubic content. Hence, the scope of the invention is to be limited only by the appended claims.

I claim:

1. In a dwelling having a floor, joists supporting said floor, side walls and a ceiling, means for controlling the humidity in said dwelling and for conserving heat, comprising a generally upright duct having its upper end adjacent said ceiling and an inlet opening adjacent said upper end, said duct having an outlet opening below said floor, a manifold in open communication with said outlet opening and extending laterally of said dwelling beneath said floor, means associated with said duct for withdrawing air from said dwelling through said inlet opening and discharging the air into said manifold, and means below said floor forming a plurality of floor heating ducts in heat exchange relation with said floor, said floor forming the top wall and said joists forming the side walls of said heating ducts, a heat insulating bottom panel member secured to the lower edges of said joists and forming the lower walls of said heating ducts, each of said floor heating ducts being in open communication with said manifold whereby air withdrawn from the interior of said dwelling is distributed beneath said floor, said floor heating ducts having openings remote from said manifold for discharging air therefrom exteriorly of the dwelling whereby the humidity of the air in said dwelling can be controlled and the heat in said air utilized by discharging air of high humidity from said dwelling after first transferring some of the heat in said air being discharged to the floor of said dwelling.

2. In a dwelling having a floor, joists supporting said floor, side walls and a ceiling, means for controlling the humidity in said dwelling and for conserving heat, comprising a generally upright duct having its upper end adjacent said ceiling and an inlet opening adjacent said upper end, said duct having an outlet opening below said floor, means associated with said duct for withdrawing air from said dwelling through said inlet opening and discharging the air through said outlet opening, a manifold positioned below said floor and connected to the outlet end of said upright duct, a plurality of outlet ports in said manifold, a plurality of ducts below said floor and in heat exchange relation therewith, said floor forming the top wall and said joists forming the side walls of said heating ducts, a heat insulating bottom panel member secured to the lower edges of said joists and forming the lower walls of said heating ducts, said ducts extending transversely of said manifold and connected thereto whereby the air from said manifold is delivered through said outlet ports to said ducts, each of said plurality of ducts having an outlet opening in the end of said duct remote from said manifold for discharging air therefrom exteriorly of the dwelling whereby the humidity of the air in said dwelling can be controlled by withdrawing humid air from said dwelling and some of the heat in said air utilized by discharging air of high humidity from said dwelling through the upright duct, manifold and the said plurality of ducts after first transferring some of the heat in said air being discharged while in said plurality of ducts to the floor of said dwelling.

3. The combination claimed in claim 2 wherein said plurality of ducts beneath the floor are substantially co-extensive in area with said floor and in heat exchange relation with the floor throughout substantially the entire floor area.

4. The combination claimed in claim 3 wherein the manifold extends transversely of the dwelling and the plurality of ducts extend longitudinally of the dwelling.

5. In a dwelling having a floor, joists supporting said floor, side walls and a ceiling, means for controlling the humidity in said dwelling and for conserving heat, comprising a generally upright duct having its upper end adjacent said ceiling and an inlet opening adjacent said upper end, said duct having an outlet opening below said floor, means associated with said duct for withdrawing air from said dwelling through said inlet opening and discharging the air through said outlet opening, a manifold positioned below said floor and connected to the outlet end of said upright duct, said manifold extending across said floor, a plurality of outlet ports in said manifold, a plurality of ducts below said floor and in heat exchange relation therewith, said floor forming the top wall and said joists forming the side walls of said heating ducts, a heat insulating bottom panel member secured to the lower edges of said joists and forming the lower walls of said heating ducts, said ducts extending transversely of said manifold and connected thereto substantially midway between their ends whereby the air from said manifold is delivered through said outlet ports to said ducts, each of said plurality of ducts having outlet openings in the ends of said duct remote from said manifold for discharging air therefrom exteriorly of the dwelling whereby the humidity of the air in said dwelling can be controlled by withdrawing humid air from said dwelling and some of the heat in said air utilized by discharging air of high humidity from said dwelling through the upright duct, manifold and the said plurality of ducts after first transferring some of the heat in said air being discharged while in said plurality of ducts to the floor of said dwelling.

6. The combination set forth in claim 5 wherein the said upright duct, manifold and the said plurality of ducts beneath the floor of the dwelling form continuous closed passageways communicating with atmosphere only through the inlet end of said upright duct and through the outlets of said plurality of ducts.

JOHN W. MILLER.

REFERENCES CITED

The following references are of record in the file of this patent:

UNITED STATES PATENTS

| Number | Name | Date |
| --- | --- | --- |
| 1,698,763 | McCauley | Jan. 15, 1929 |
| 2,127,095 | Strong | Aug. 16, 1938 |
| 2,195,691 | Burt | Apr. 2, 1940 |
| 2,225,244 | Anderson | Dec. 17, 1940 |
| 2,272,356 | Sims | Feb. 10, 1942 |
| 2,315,636 | McCollum | Apr. 6, 1943 |
| 2,326,318 | Anderson | Aug. 10, 1943 |